United States Patent
Karasuno (10) Patent No.: US 12,482,886 B2
(45) Date of Patent: Nov. 25, 2025

(54) BATTERY AND METHOD OF MANUFACTURING SAME

(71) Applicant: PRIME PLANET ENERGY & SOLUTIONS, INC., Tokyo (JP)

(72) Inventor: Kaito Karasuno, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 593 days.

(21) Appl. No.: 17/938,121

(22) Filed: Oct. 5, 2022

(65) Prior Publication Data

US 2023/0111134 A1     Apr. 13, 2023

(30) Foreign Application Priority Data

Oct. 8, 2021   (JP) .................................. 2021-166264

(51) Int. Cl.
*H01M 50/184*   (2021.01)
*H01M 10/0525*  (2010.01)
*H01M 50/103*   (2021.01)
*H01M 50/133*   (2021.01)
*H01M 50/186*   (2021.01)
*H01M 50/636*   (2021.01)

(52) U.S. Cl.
CPC ..... *H01M 50/184* (2021.01); *H01M 10/0525* (2013.01); *H01M 50/103* (2021.01); *H01M 50/133* (2021.01); *H01M 50/186* (2021.01); *H01M 50/636* (2021.01)

(58) Field of Classification Search
None
See application file for complete search history.

(56) References Cited

U.S. PATENT DOCUMENTS

| | | | | |
|---|---|---|---|---|
| 4,521,147 A | * | 6/1985 | King, Jr. ............. | F16B 19/1054 411/542 |
| 2007/0271764 A1 | * | 11/2007 | Stevenson .............. | B21J 15/043 29/709 |

(Continued)

FOREIGN PATENT DOCUMENTS

| CN | 104781952 A |   | 7/2015 |
|---|---|---|---|
| JP | 2014120389 A | * | 6/2014 |

(Continued)

*Primary Examiner* — Maria V Ewald
*Assistant Examiner* — Suhani Jitendra Patel
(74) *Attorney, Agent, or Firm* — Finnegan, Henderson, Farabow, Garrett and Dunner, LLP (57) ABSTRACT

A battery includes: an electrode assembly and an electrolyte solution; an exterior container that is provided with an injection hole; and a sealing member that is fixed to the exterior container by swaging. The sealing member includes: a first member having a stem portion; and a second member having an engagement portion engaged with the stem portion. The stem portion has an abutment surface with which the engagement portion is in abutment, and a swaging-fixation portion formed to be located between an inner surface of the exterior container and the engagement portion so as to fix the sealing member to the exterior container. A relation of 0.55≤B/A is satisfied between a thickness (A) of a portion of the exterior container in which the injection hole is formed and a distance (B) between the abutment surface of the stem portion and the inner surface of the exterior container.

10 Claims, 6 Drawing Sheets

(56) References Cited

U.S. PATENT DOCUMENTS

| | | | |
|---|---|---|---|
| 2011/0072648 A1* | 3/2011 | Yamauchi | H01M 10/04 29/623.2 |
| 2022/0123402 A1* | 4/2022 | Gonda | H01M 50/449 |

FOREIGN PATENT DOCUMENTS

| JP | 2015210950 A | * | 11/2015 |
| JP | 2019-044928 A | | 3/2019 |
| KR | 20160084042 A | * | 7/2016 |

* cited by examiner

BATTERY AND METHOD OF MANUFACTURING SAME

This nonprovisional application is based on Japanese Patent Application No. 2021-166264 filed on Oct. 8, 2021, with the Japan Patent Office, the entire contents of which are hereby incorporated by reference.

BACKGROUND OF THE INVENTION

Field of the Invention

The present technology relates to a battery and a method of manufacturing the battery.

Description of the Background Art

Conventionally, a structure has been employed in which an electrolyte solution is injected into an exterior container of a battery and then an electrolyte solution injection hole is sealed by a sealing member. Such a structure is described, for example, in Japanese Patent Laying-Open No. 2019-44928. In the structure described in Japanese Patent Laying-Open No. 2019-44928, the sealing member is fixed to an exterior container by swaging.

SUMMARY OF THE INVENTION

In the case where the sealing member is fixed to the exterior container by swaging, it is required to maintain a stable sealing state in order to secure hermeticity of the exterior container. It is an object of the present technology to provide: a battery in which a stable sealing state of an electrolyte solution injection hole by a sealing member can be maintained; and a method of manufacturing the battery.

A battery according to the present technology includes: an electrode assembly and an electrolyte solution; an exterior container that includes an outer surface and an inner surface, that accommodates the electrode assembly and the electrolyte solution, and that is provided with an injection hole extending from the outer surface to the inner surface; and a sealing member that is fixed to the exterior container by swaging and that seals the injection hole. The sealing member includes: a first member having a stem portion inserted into the injection hole; and a second member having an engagement portion engaged with the stem portion. The stem portion has an abutment surface with which the engagement portion is in abutment, and a swaging-fixation portion formed to be located between the inner surface of the exterior container and the engagement portion so as to fix the sealing member to the exterior container. A relation of $0.55 \leq B/A$ is satisfied between a thickness (A) of a portion of the exterior container in which the injection hole is formed and a distance (B) between the abutment surface of the stem portion and the inner surface of the exterior container.

A method of manufacturing a battery according to the present technology includes: accommodating an electrode assembly in an exterior container; injecting an electrolyte solution into the exterior container via an injection hole provided in the exterior container; and sealing the injection hole with a sealing member. The sealing includes: preparing a first member having a stem portion and a second member having an engagement portion to be engaged with the stem portion; inserting the stem portion into the injection hole; and forming a swaging-fixation portion at the stem portion between an inner surface of the exterior container and the engagement portion by bringing the engagement portion of the second member into abutment with an abutment surface formed at the stem portion of the first member so as to compress the stem portion by the engagement portion. A relation of $1.37 \leq C/A$ is satisfied between a thickness (A) of a portion of the exterior container in which the injection hole is formed and a distance (C) between the abutment surface of the stem portion and the inner surface of the exterior container in a state before forming the swaging-fixation portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

The battery according to the present embodiment is typically a lithium ion secondary battery to be mounted on a vehicle. In the present specification, however, the term "battery" is not limited to the lithium ion battery, and may include another battery such as a nickel-metal hydride battery.

Figure 1:
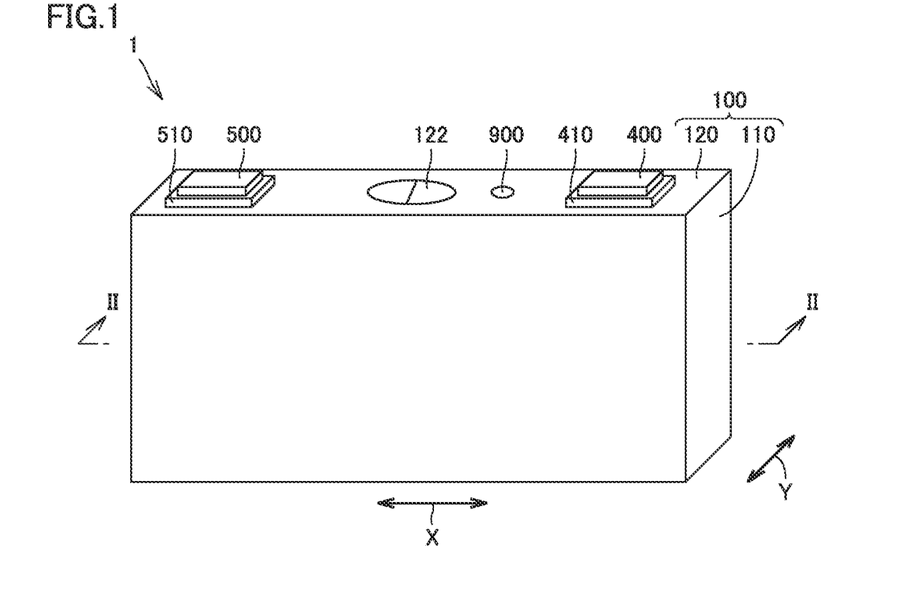
FIG. 1 is a perspective view of a prismatic secondary battery.
Figure 2:
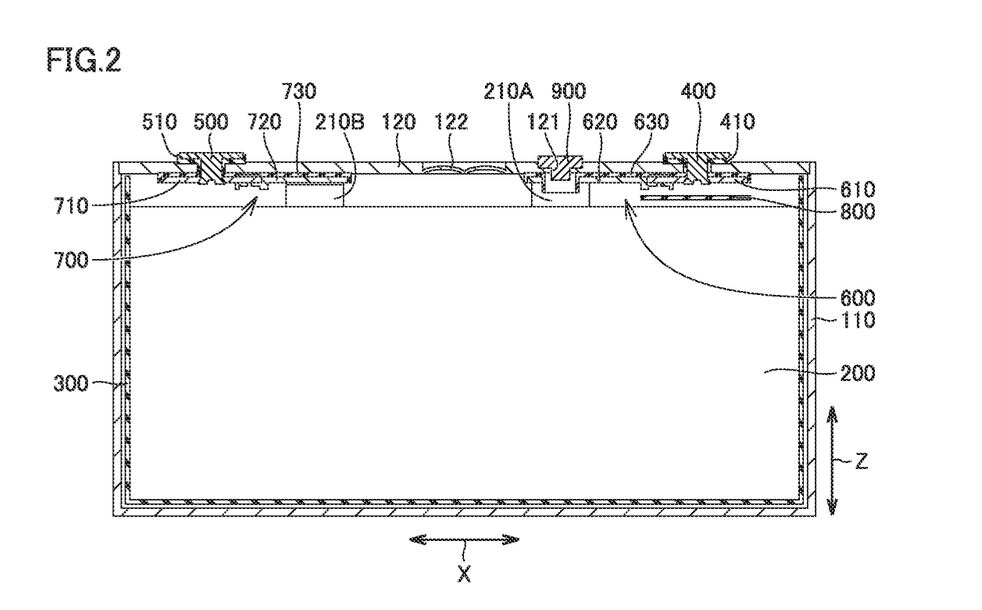
FIG. 2 is a cross sectional view taken along II-II in FIG. 1.

FIG. 1 is a perspective view of a prismatic secondary battery 1. FIG. 2 is a cross sectional view taken along II-II in FIG. 1.

As shown in FIGS. 1 and 2, prismatic secondary battery 1 includes a battery case 100, an electrode assembly 200, an insulating sheet 300, a positive electrode terminal 400, a negative electrode terminal 500, a positive electrode current collecting member 600, a negative electrode current collecting member 700, a cover member 800, and a sealing member 900.

Battery case 100 is constituted of: a prismatic exterior body 110 that is provided with an opening and that has a prismatic tubular shape having a bottom; and a sealing plate 120 that seals the opening of prismatic exterior body 110. Each of prismatic exterior body 110 and sealing plate 120 is preferably composed of a metal, and is preferably composed of aluminum or an aluminum alloy.

Sealing plate 120 is provided with an electrolyte solution injection hole 121. After injecting an electrolyte solution into battery case 100 via electrolyte solution injection hole 121, electrolyte solution injection hole 121 is sealed by sealing member 900 (rivet).

Sealing plate 120 is provided with a gas discharge valve 122. Gas discharge valve 122 is fractured when pressure in battery case 100 becomes more than or equal to a predetermined value. Thus, gas in battery case 100 is discharged to outside of battery case 100.

Electrode assembly 200 is accommodated in battery case 100 together with the electrolyte solution. Electrode assembly 200 is formed by stacking positive electrode plates and negative electrode plates with separators being interposed therebetween. Insulating sheet 300, which is composed of a resin, is disposed between electrode assembly 200 and prismatic exterior body 110.

A positive electrode tab 210A and a negative electrode tab 210B are provided at an end portion of electrode assembly 200 on the sealing plate 120 side.

Positive electrode tab 210A and positive electrode terminal 400 are electrically connected to each other via positive electrode current collecting member 600. Positive electrode current collecting member 600 includes a first positive electrode current collector 610 and a second positive electrode current collector 620. It should be noted that positive electrode current collecting member 600 may be constituted of one component. Positive electrode current collecting member 600 is preferably composed of a metal, and is more preferably composed of aluminum or an aluminum alloy.

Negative electrode tab 210B and negative electrode terminal 500 are electrically connected to each other via negative electrode current collecting member 700. Negative electrode current collecting member 700 includes a first negative electrode current collector 710 and a second negative electrode current collector 720. It should be noted that negative electrode current collecting member 700 may be constituted of one component. Negative electrode current collecting member 700 is preferably composed of a metal, and is more preferably composed of copper or a copper alloy.

Positive electrode terminal 400 is fixed to sealing plate 120 with an outer side insulating member 410 being interposed therebetween, outer side insulating member 410 being composed of a resin. Negative electrode terminal 500 is fixed to sealing plate 120 with an outer side insulating member 510 being interposed therebetween, outer side insulating member 510 being composed of a resin.

Positive electrode terminal 400 is preferably composed of a metal, and is more preferably composed of aluminum or an aluminum alloy. Negative electrode terminal 500 is preferably composed of a metal, and is more preferably composed of copper or a copper alloy. Negative electrode terminal 500 may have: a region that is composed of copper or a copper alloy and that is disposed on the inner side of battery case 100; and a region that is composed of aluminum or an aluminum alloy and that is disposed on the outer side of battery case 100.

Cover member 800 is located between first positive electrode current collector 610 and electrode assembly 200. Cover member 800 may be provided on the negative electrode current collector side. Further, cover member 800 is not an essential member, and may be omitted as appropriate.

When manufacturing prismatic secondary battery 1, positive electrode terminal 400, negative electrode terminal 500, positive electrode current collecting member 600, negative electrode current collecting member 700, and cover member 800 are assembled to sealing plate 120. On the other hand, electrode assembly 200 is surrounded by insulating sheet 300. Electrode assembly 200 and insulating sheet 300 are inserted into prismatic exterior body 110. Thereafter, sealing plate 120 is welded to prismatic exterior body 110 to seal the opening of prismatic exterior body 110 by sealing plate 120, thereby forming sealed battery case 100.

Thereafter, a non-aqueous electrolyte is injected into battery case 100 through electrolyte solution injection hole 121 provided in sealing plate 120. Examples of the non-aqueous electrolyte solution usable herein include a non-aqueous electrolyte solution including ethylene carbonate (EC), ethyl methyl carbonate (EMC), diethyl carbonate (DEC), and dimethyl carbonate (DMC).

After injecting the non-aqueous electrolyte solution, a decompression step in battery case 100 is performed, and then electrolyte solution injection hole 121 is sealed by sealing member 900. By performing the above steps, prismatic secondary battery 1 is completed.

Figure 3:
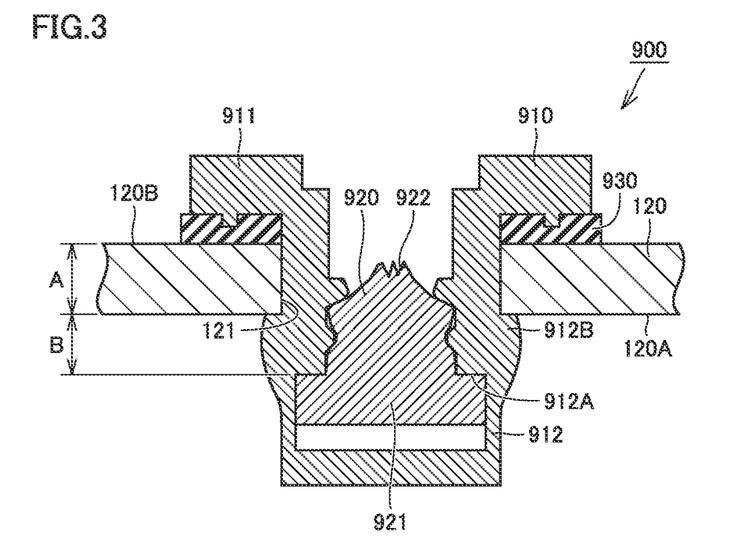
FIG. 3 is a cross sectional view showing a structure of a sealing member according to one embodiment.

FIG. 3 is a cross sectional view showing the structure of sealing member 900 according to the present embodiment. As shown in FIG. 3, sealing member 900 includes a first member 910, a second member 920, and a third member 930.

First member 910 (sleeve) is typically composed of a metal, but is not limited thereto. First member 910 includes a flange portion 911 and a stem portion 912.

Flange portion 911 faces outer surface 120B of sealing plate 120. Flange portion 911 is positioned on an outer side in the radial direction of stem portion 912 outside battery case 100.

Stem portion 912 is inserted into electrolyte solution injection hole 121. Stem portion 912 has: an abutment surface 912A with which second member 920 is in abutment; and a swaging-fixation portion 912B positioned between inner surface 120A of battery case 100 and abutment surface 912A. Sealing member 900 including first member 910 is fixed to sealing plate 120 by swaging-fixation portion 912B.

Second member 920 (mandrel) is typically composed of a metal, but is not limited thereto. Second member 920 includes an engagement portion 921 and a cut portion 922.

Engagement portion 921 is in abutment with abutment surface 912A of first member 910. Thus, second member 920 is engaged with stem portion 912 of first member 910. Cut portion 922 is a portion obtained by cutting second member 920 in the step of forming swaging-fixation portion 912B. By providing a fragile portion in second member 920 in advance, the position of cut portion 922 can be determined.

Third member 930 (washer) is composed of a material (for example, a resin or the like) having a lower hardness than that of first member 910. Third member 930 is compressed between flange portion 911 of first member 910 and outer surface 120B of sealing plate 120. Thus, third member 930 can seal between flange portion 911 and outer surface 120B of sealing plate 120.

The thickness (A) of sealing plate 120 is, for example, about more than or equal to 1.0 mm and less than or equal to 3.0 mm. A distance (B) between abutment surface 912A of first member 910 and inner surface 120A of sealing plate 120 is set to fall within a range satisfying a relation of $0.55 \leq B/A$.

In the example shown in FIG. 3, the thickness (A) of sealing plate 120 is 1.17 mm, and the distance (B) between abutment surface 912A of first member 910 and inner surface 120A of sealing plate 120 is 0.71 mm. Therefore, B/A=0.61.

Figure 4:
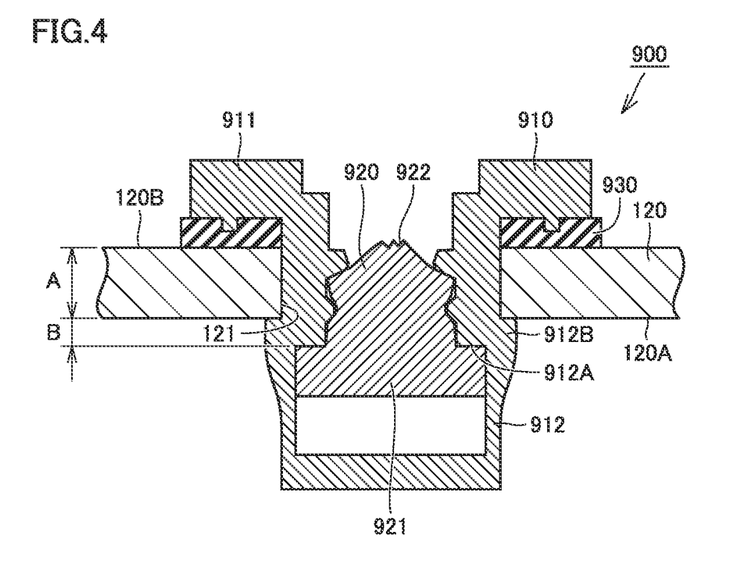
FIG. 4 is a cross sectional view showing a structure of a sealing member according to a comparative example.

FIG. 4 is a cross sectional view showing a structure of a sealing member 900 according to a comparative example. Also in the comparative example shown in FIG. 4, the basic structure is the same as the structure shown in FIG. 3. However, in the example shown in FIG. 4, the thickness (A) of sealing plate 120 is 1.08 mm, and the distance (B) between abutment surface 912A of first member 910 and inner surface 120A of sealing plate 120 is 0.33 mm. Therefore, B/A=0.31.

Thus, in sealing member 900 (FIG. 3) according to the present embodiment, the ratio (B/A) of the distance (B) between abutment surface 912A of first member 910 and inner surface 120A of sealing plate 120 with respect to the thickness (A) of sealing plate 120 is higher than that in sealing member 900 (FIG. 4) according to the comparative example. Specifically, in the structure of FIG. 3, the relation of $0.55 \leq B/A$ is satisfied because B/A=0.61, whereas in the structure of FIG. 4, the relation of $0.55 \leq B/A$ is not satisfied because B/A=0.31.

According to sealing member 900 (FIG. 3) of the present embodiment, the shape of swaging-fixation portion 912B formed between abutment surface 912A of first member 910 and inner surface 120A of sealing plate 120 can be stabilized, thereby maintaining a stable sealing state of electrolyte solution injection hole 121 by sealing member 900.

Figure 5:
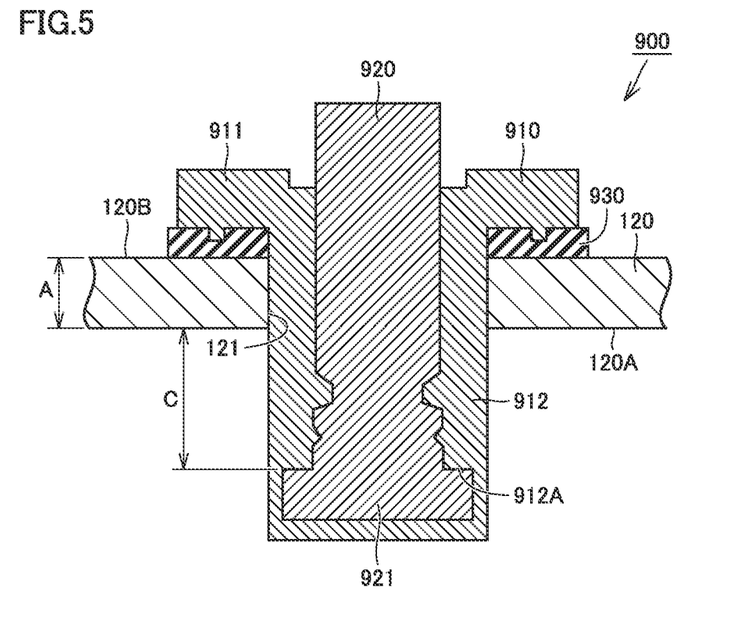
FIG. 5 is a cross sectional view showing the structure of the sealing member according to the one embodiment before fixing by swaging.

FIG. 5 is a cross sectional view showing the structure of sealing member 900 according to the present embodiment before fixing by swaging. As shown in FIG. 5, stein portion 912 in which swaging-fixation portion 912B is not formed is inserted into electrolyte solution injection hole 121. Engagement portion 921 of second member 920 is in abutment with abutment surface 912A of stem portion 912. From the state shown in FIG. 5, second member 920 is pulled up and engagement portion 921 compresses stem portion 912, thereby forming swaging-fixation portion 912B.

In the state shown in FIG. 5, a distance (C) between abutment surface 912A of first member 910 and inner surface 120A of sealing plate 120 is set to fall within a range satisfying a relation of $1.37 \leq C/A$.

In the example shown in FIG. 5, the thickness (A) of sealing plate 120 is 1.00 mm, and the distance (C) between abutment surface 912A of first member 910 and inner surface 120A of sealing plate 120 is 1.76 mm. Therefore, C/A=1.76.

Figure 6:
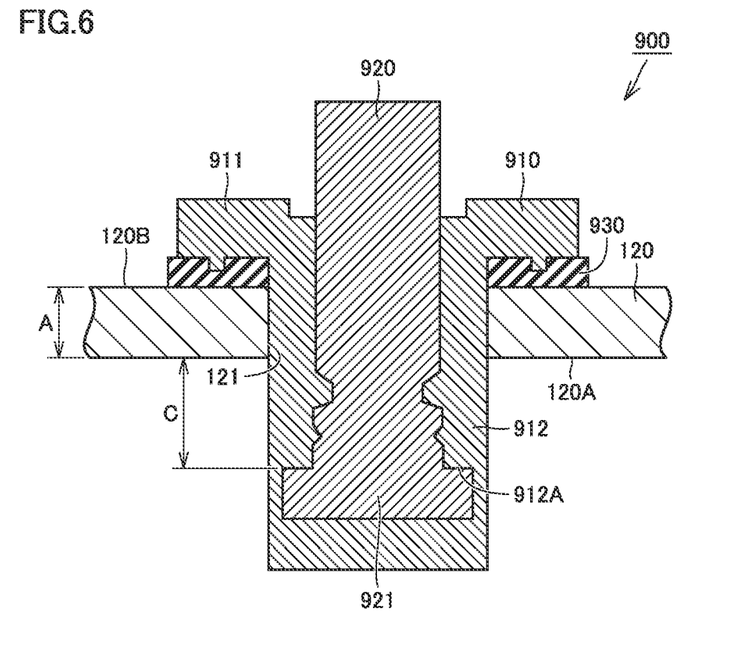
FIG. 6 is a cross sectional view showing the structure of the sealing member according to the comparative example before fixing by swaging.

FIG. 6 is a cross sectional view showing the structure of sealing member 900 according to the comparative example before fixing by swaging. Also in the comparative example shown in FIG. 6, the basic structure is the same as the structure shown in FIG. 5. However, in the example shown in FIG. 6, the thickness (A) of sealing plate 120 is 1.50 mm, and the distance (C) between abutment surface 912A of first member 910 and inner surface 120A of sealing plate 120 is 1.29 mm. Therefore, C/A=0.86.

Thus, in sealing member 900 (FIG. 5) according to the present embodiment before fixing by swaging, the ratio (C/A) of the distance (C) between abutment surface 912A of first member 910 and inner surface 120A of sealing plate 120 with respect to the thickness (A) of sealing plate 120 is higher than that in sealing member 900 (FIG. 6) according to the comparative example before fixing by swaging. Specifically, in the structure of FIG. 5, the relation of $1.37 \leq C/A$ is satisfied because C/A=1.76, whereas in the structure of FIG. 6, the relation of $1.37 \leq C/A$ is not satisfied because C/A=0.86.

According to sealing member 900 (FIG. 5) of the present embodiment before fixing by swaging, the distance of stem portion 912 positioned between abutment surface 912A of first member 910 and inner surface 120A of sealing plate 120 is set to be large, so that a margin for buckling of stem portion 912 in the swaging step is large. As a result, the shape of swaging-fixation portion 912B formed between abutment surface 912A of first member 910 and inner surface 120A of sealing plate 120 can be stabilized, thereby maintaining the stable sealing state of electrolyte solution injection hole 121 by sealing member 900.

Figure 7A:
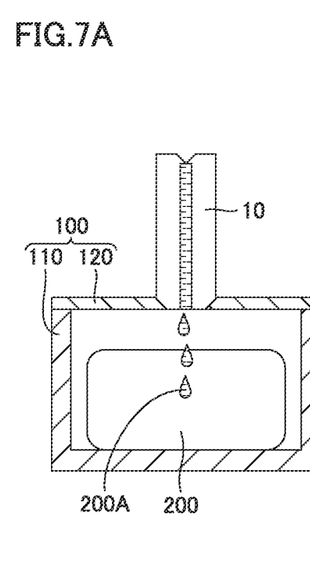
FIGS. 7A to 7D are diagrams showing a step of injecting an electrolyte solution and a step of swaging the sealing member.

FIGS. 7A to 7D are diagrams showing a step of injecting the electrolyte solution and a step of swaging the sealing member. As shown in FIG. 7A, an electrolyte solution 200A is injected into battery case 100 using an injection nozzle 10 (step of injecting).

Figure 7B:
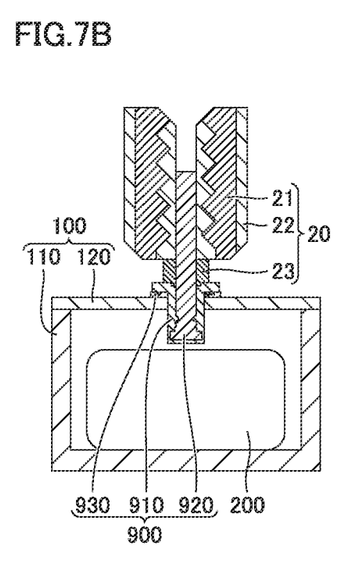

After the step of injecting electrolyte solution 200A, the step of swaging sealing member 900 is performed. As shown in FIG. 7B, sealing member 900 is assembled to sealing plate 120. On this occasion, first member 910 of sealing member 900 is inserted into battery case 100 of sealing plate 120. A swaging jig 20 is provided on sealing member 900.

Figure 7C:
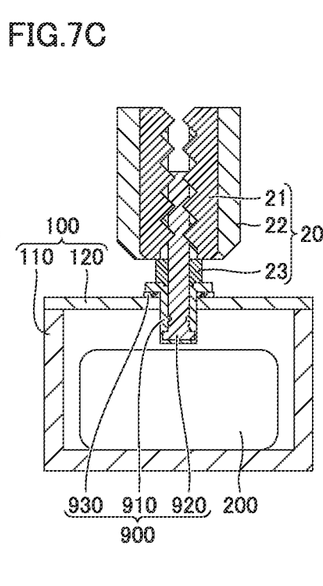
Figure 7D:
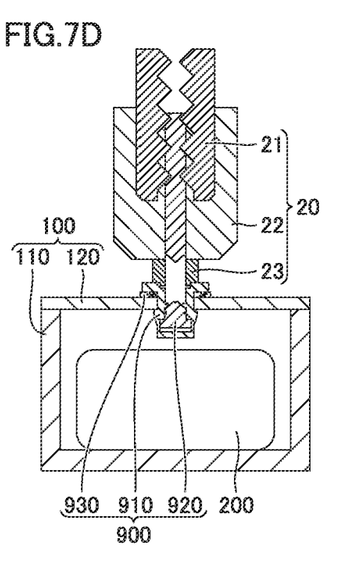

Swaging jig 20 includes a jaw 21, a head 22, and a pressing portion 23. As shown in FIG. 7C, second member 920 of sealing member 900 is held by jaw 21 provided in head 22. From this state, jaw 21 is pulled upward in the figure. Thus, as shown in FIG. 7D, first member 910 is fixed to sealing plate 120 by swaging, and second member 920 is cut inside first member 910. First member 910 is pressed downward by pressing portion 23 in the figure. Thus, third member 930 is pressed, with the result that third member 930 seals between first member 910 and sealing plate 120.

Figure 8A:
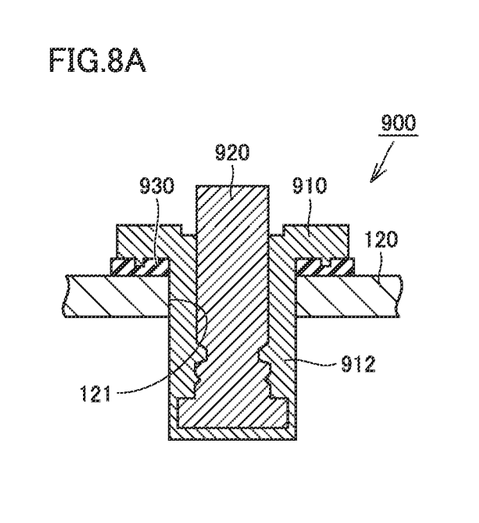
FIGS. 8A to 8C are cross sectional views illustrating the step of swaging the sealing member according to the one embodiment.
Figure 8B:
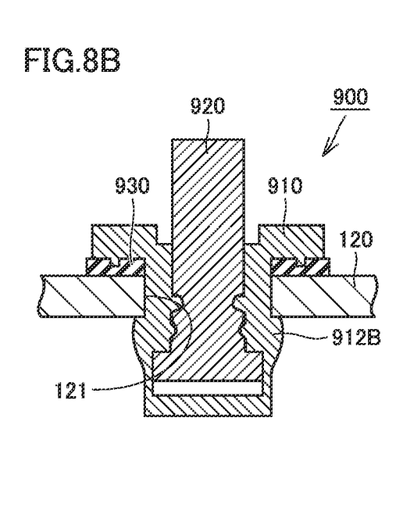
Figure 8C:
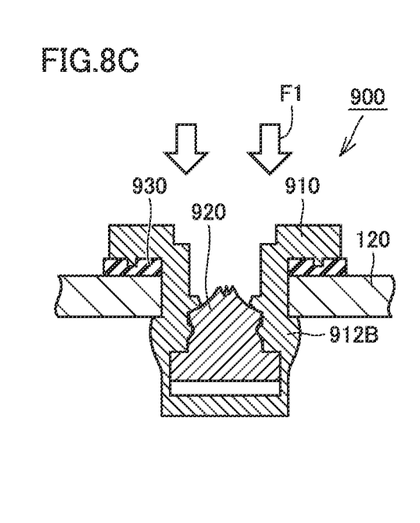

FIGS. 8A to 8C are cross sectional views showing the step of swaging the sealing member according to the present embodiment. As shown in FIG. 8A, stem portion 912 of first member 910 is inserted into electrolyte solution injection hole 121.

Next, as shown in FIG. 8B, by pulling up second member 920, a portion of stem portion 912 is buckled to form swaging-fixation portion 912B. In the present embodiment, as described above, since a large margin for buckling of stem portion 912 is secured, sufficient swaging-fixation portion 912B can be formed even when an amount of movement of second member 920 is small. Therefore, formed swaging-fixation portion 912B is suppressed from entering electrolyte solution injection hole 121.

After swaging-fixation portion 912B is formed, as shown in FIG. 8C, first member 910 is pressed downward in the figure to compress third member 930. As described above, since swaging-fixation portion 912B is suppressed from entering electrolyte solution injection hole 121, deformation of sealing plate 120 is suppressed when first member 910 is pressed downward (arrows F1).

Figure 9A:
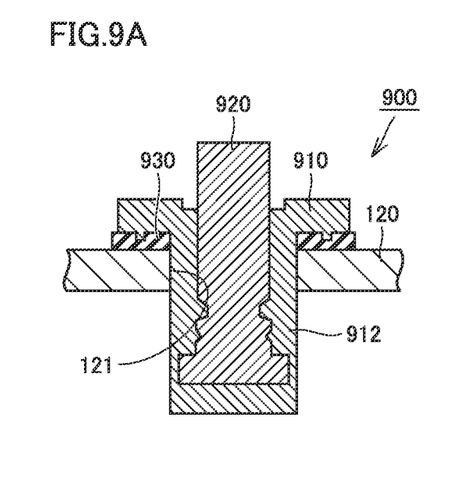
FIGS. 9A to 9C are cross sectional views showing the step of swaging the sealing member according to the comparative example.
Figure 9B:
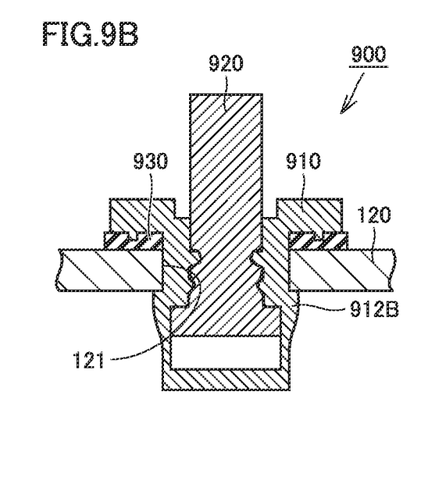
Figure 9C:
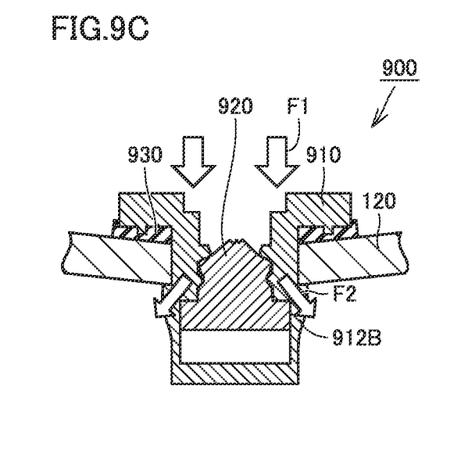

FIGS. 9A to 9C are cross sectional views showing the step of swaging the sealing member according to the comparative example. Also in the comparative example shown in FIGS. 9A to 9C, the basic steps are the same as those shown in FIGS. 8A to 8C. However, since the margin for buckling of stein portion 912 is small in the example shown in FIGS. 9A to 9C, it is necessary to attain a large amount of movement of second member 920 in order to form swaging-fixation portion 912B having a necessary swaging strength. Therefore, formed swaging-fixation portion 912B is likely to enter electrolyte solution injection hole 121. As a result, when first member 910 is pressed downward (arrows F1), downward force (arrows F2) is also likely to act on sealing plate 120, with the result that sealing plate 120 is likely to be deformed.

According to sealing member 900 of the present embodiment, since the margin for buckling of stem portion 912 of first member 910 is large, swaging-fixation portion 912B is suppressed from entering electrolyte solution injection hole 121, thereby preventing deformation of sealing plate 120. In other words, third member 930 can be sufficiently compressed while suppressing deformation of sealing plate 120, thereby improving sealing performance. As a result, the stable sealing state of electrolyte solution injection hole 121 by sealing member 900 can be maintained.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery comprising:
   an electrode assembly and an electrolyte solution;
   an exterior container that includes an outer surface and an inner surface, that accommodates the electrode assembly and the electrolyte solution, and that is provided with an injection hole extending from the outer surface to the inner surface; and
   a sealing member that is fixed to the exterior container by swaging and that seals the injection hole, wherein
   the sealing member includes
       a first member having a stem portion inserted into the injection hole, and
       a second member having an engagement portion engaged with the stem portion,
   the stem portion has an abutment surface with which the engagement portion is in abutment, and a swaging-fixation portion formed to be located between the inner surface of the exterior container and the engagement portion so as to fix the sealing member to the exterior container, and
   a relation of $0.55 \leq B/A$ is satisfied between a thickness (A) of a portion of the exterior container in which the injection hole is formed and a distance (B) between the abutment surface of the stem portion and the inner surface of the exterior container.

2. The battery according to claim 1, wherein
   the first member further has a flange portion positioned on an outer side in a radial direction of the stem portion outside the exterior container, and
   the sealing member further includes a third member that seals between the flange portion and the outer surface of the exterior container.

3. The battery according to claim 1, wherein the thickness (A) of the portion of the exterior container in which the injection hole is formed is more than or equal to 1.0 mm and less than or equal to 3.0 mm.

4. The battery according to claim 1, wherein the exterior container is provided with an opening and includes a main body that accommodates the electrode assembly, and a sealing plate coupled to the main body, and the injection hole is formed in the sealing plate.

5. The battery according to claim 1, wherein the exterior container has a prismatic shape.

6. A method of manufacturing a battery, the method comprising:
   accommodating an electrode assembly in an exterior container;
   injecting an electrolyte solution into the exterior container via an injection hole provided in the exterior container; and
   sealing the injection hole with a sealing member, wherein the sealing includes
       preparing a first member having a stem portion and a second member having an engagement portion to be engaged with the stem portion,
       inserting the stem portion into the injection hole, and
       forming a swaging-fixation portion at the stem portion between an inner surface of the exterior container and the engagement portion by bringing the engagement portion of the second member into abutment with an abutment surface formed at the stem portion of the first member so as to compress the stem portion by the engagement portion, and
   a relation of $1.37 \leq C/A$ is satisfied between a thickness (A) of a portion of the exterior container in which the injection hole is formed and a distance (C) between the abutment surface of the stem portion and the inner surface of the exterior container in a state before forming the swaging-fixation portion.

7. The method of manufacturing the battery according to claim 6, wherein
   the first member further has a flange portion positioned on an outer side in a radial direction of the stem portion outside the exterior container, and
   the sealing further includes
       providing a third member between the flange portion and an outer surface of the exterior container, and
       pressing the flange portion toward the third member to seal between the flange portion and the outer surface of the exterior container by the third member.

8. The method of manufacturing the battery according to claim 6, wherein the thickness (A) of the portion of the exterior container in which the injection hole is formed is more than or equal to 1.0 mm and less than or equal to 3.0 mm.

9. The method of manufacturing the battery according to claim 6, wherein
   the accommodating of the electrode assembly in the exterior container includes
       preparing a main body and a sealing plate to be coupled to the main body, accommodating the electrode assembly in the main body through an opening of the main body, and coupling the sealing plate to the main body, and the injection hole is formed in the sealing plate.

10. The method of manufacturing the battery according to claim 6, wherein the exterior container has a prismatic shape.

\* \* \* \* \*